United States Patent [19]

Ermachkov et al.

[11] 4,285,190
[45] Aug. 25, 1981

[54] ROTOBALER

[76] Inventors: Vladimir G. Ermachkov, 8 mikroraion, 31, kv. 59; Vladimir G. Zhavoronkin, 6 mikroraion, 1, kv. 69, both of Frunze, U.S.S.R.

[21] Appl. No.: 62,123

[22] Filed: Jul. 30, 1979

[51] Int. Cl.³ .............................................. A01D 39/00
[52] U.S. Cl. ...................................... 56/341; 100/15; 100/76
[58] Field of Search ...................... 56/341, 343; 100/5, 100/15, 76, 82, 88, 89

[56] References Cited

U.S. PATENT DOCUMENTS

| | | | |
|---|---|---|---|
| 2,696,777 | 12/1954 | Sutch | 56/341 |
| 2,893,308 | 7/1959 | Bodisch | 100/15 |

*Primary Examiner*—Jay N. Eskovitz
*Attorney, Agent, or Firm*—Lackenbach, Lilling & Siegel

[57] ABSTRACT

A distinguishing feature of the present invention is that the bailing chamber of the rotobaler is installed between the end walls of the frame in a direction parallel to the direction of movement of the machine. The baling chamber is made in the form of a tube rotatably secured on the frame around its own axis. Provided inside the tube is a roller table movably secured relative to the baling chamber.

6 Claims, 6 Drawing Figures

ROTOBALER

FIELD OF THE INVENTION

The present invention relates to machines for making hay or straw into rolls and more particularly it relates to rotobalers.

The present invention can be used in agriculture for making various hay-and-straw materials into rolls of various density and mass. Besides, it will prove useful in fodder making and in other applications calling for baling rolls from hay, straw and similar materials.

DESCRIPTION OF THE PRIOR ART

Currently known are several types of rotobalers comprising a frame on which devices for picking hay and straw from swaths and a baling chamber are mounted.

The baling chamber of such rotobalers may be formed by two or more rows of endless belts, rake-carrying chains, or by rotating rollers arranged parallel along the chamber perimeter.

The pick-up means deliver the hay or straw material from swaths into the baling chamber where said material is twisted into a roll by means of belts, rakes or rotating rolls.

A disadvantage of the known rotobalers is that the rotation axis of the roll in the baling chamber is arranged perpendicularly to the direction of movement so that the length of the roll is, as a rule, equal to the width of the picked-up swath and amounts to 1.4–1.5 m, in rare cases reaching 1.6–1.7 m, the roll diameter not exceeding 1.8 m.

Such dimensions of the rolls govern their volume and mass which do not exceed 4 $m^3$ and 1000 kg, respectively.

Further increase of the roll mass in the cited rotobalers can be achieved only by increasing the roll diameter since its length is limited by the width of the picked-up swaths and the overall dimensions of the machine.

The increase in the diameter of the roll is limited by the problem of its stability on the side surface.

Known in the prior art is a rotobaler comprising a frame which supports a means for picking up hay and straw from swaths and a baling chamber.

The baling chamber of such a rotobaler is formed by two rows of endless belts, compressing and conveying belts. Each row of belts passes over a system of driving and tensioning shafts. The hay-and-straw material passes from the pick-up means under the compressing roller installed before the inlet opening of the baling chamber and, being compacted, enters the chamber where it is twisted into a roll by the conveying and compressing belts which move towards one another. Then the ready roll is discharged from the baling chamber through a discharge opening.

A disadvantage of said rotobaler is that the lower portion of the compressing belts moves towards the movement of the material being compressed so that with large and loose swaths, when the mass passes above the compressing roller, it falls on the onrunning belts and is thrown back, which results in crowding of the mass before the pick-up means and clogging of the latter.

Another disadvantage of said rotobaler is that, when the machine picks up long-stalk materials, individual stalks get across the gap between the conveying belts and the compressing roller and begin functioning as a grate on which the picked up material is retarded and heaped. This leads to clogging of the rotobaler which calls for manual cleaning thus reducing the efficiency of baling and increasing losses of the baled material.

SUMMARY OF THE INVENTION

The main object of the invention is to provide a rotobaler which steps up the baling efficiency.

Another object of the invention is to reduce losses of the baled material as compared with the known rotobalers.

Still another object of the invention is to make large-size rolls whose length would be larger than their diameter.

A further object of the invention is to provide a rotobaler which would make rolls of the required dimensions and mass.

A still further object of the invention is to improve the reliability of the baling chamber.

These and other objects are achieved by providing a rotobaler comprising a frame which supports a means for picking up hay and straw materials from swaths and a baling chamber with openings for loading the picked-up material and unloading the ready roll. According to the invention, the rotobaler is provided with a frame with end walls between which is accommodated a baling chamber mounted parallel to the direction of rotobaler movement. The baling chamber is made in the form of a tube installed on the frame with a provision for rotating around its own axis and accommodating a roller table movably secured relative to the baling chamber.

It is expedient that said tube should accommodate inside, on both sides of said table, a hinged compressing roller and a radially curved shield with a deflecting roller and supporting rollers on the upper end.

Further, it is expedient that the tube and the compressing roller on one side and the deflecting roller and the rollers of the roller table on the other should be installed with a provision for rotating in mutually opposite directions.

Further, it is expedient that the inside surface of the tube and the outer surfaces of the deflecting roller and of the roller table rollers should be provided with flutes.

It is desirable that the tube should accommodate inside, on the roller table, some elements which distribute uniformly the material throughout the volume of the tube. In one of the embodiments of the device there is a provision for installing close-up members in the form of rubberized belts between the tube and the end walls of the frame.

The essence of the disclosed invention consists in the following.

The rotobaler, whose baling chamber is made in the form of a tube installed between the end walls of the frame with a provision for rotating around its axis arranged parallel to the direction of rotobaler movement, produces large-size rolls whose length may exceed considerably their diameter.

Owing to the provision of a loading opening in the front end wall, the material is delivered by the pick-up means into the baling chamber; the downward movement of the roller table, turning of the rear end wall and longitudinal tilting of the frame insure discharging of the baled roll.

Owing to the provision of flutes on the inside surface of the tube, and to the hinged suspension of the compressing roller on the roller table and their unidirectional rotation, any amount of material delivered by the pick-up means can be reliably gripped, compressed and moved from the baling chamber space under the roller table into the space above the roller table.

The provision of a radially curved shield with a deflecting roller at the upper end prevents the material from falling back into the space under the roller table in the baling chamber, the provision of supporting rollers mounted on the same upper end of the curved shield insures the required minimum clearance between the deflecting roller and the tube.

Owing to the opposite rotation of the roller table rollers relative to the direction of rotation of the tube and to the provision of flutes on their surface, the material entering the space above the roller table acquires the required direction of rotation.

The elements installed on the roller table insure uniform filling of the baling chamber and intertwining of the individual portions of the material in the process of roll forming which increases mechanical strength of the ready roll. This is particularly important when baling short-stalk material (hay or straw).

The provision of close-up members installed between the end walls of the frame and the baling chamber tube reduces losses of the material being baled.

This layout of the rotobalers makes it possible to produce large rolls characterized by most rational dimensions and mass. An important factor for transportation and storage is that the length of the roll can be considerably larger than its diameter. Such rotobalers increase output, curtail losses of the most valuable small fractions of hay and increase the mechanical strength of the finished rolls.

Carrying the largest rolls whose dimensions may reach about 3.5 m in length, 2.8 m in diameter and which may weigh up to 4 t. the rotobaler according to the invention fits well into the traffic and hardly goes beyond the regulation overall dimensions set for transport vehicles on the road.

Such rotobalers reduce sharply the prime cost of hay and straw production and are most valuable in that they free a large number of hands in strenuous periods of summer field work related to harvesting and preparation of fodder.

BRIEF DESCRIPTION OF THE DRAWINGS

Now the invention will be described in detail by way of example with reference to the accompanying drawings in which.

DETAILED DESCRIPTION OF THE INVENTION

Figure 1:
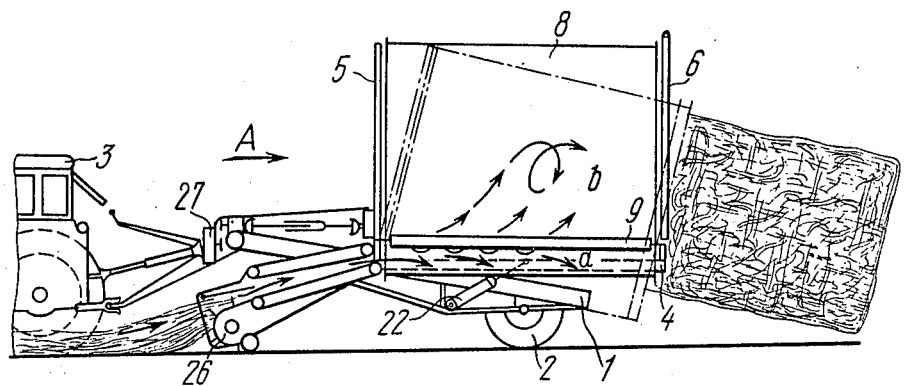
FIG. 1 is a side longitudinal view of the rotobaler.
Figure 2:
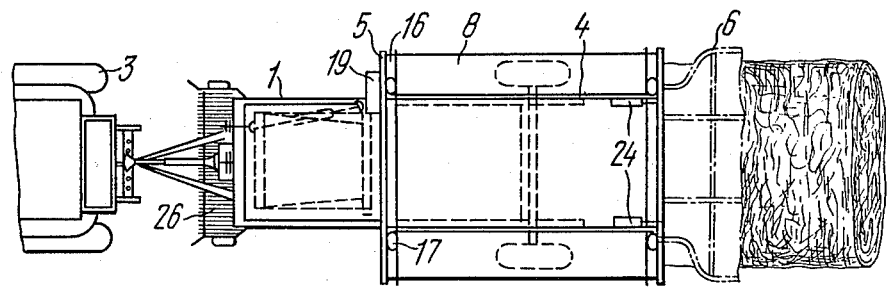
FIG. 2 is a top view of the rotobaler.
Figure 3:
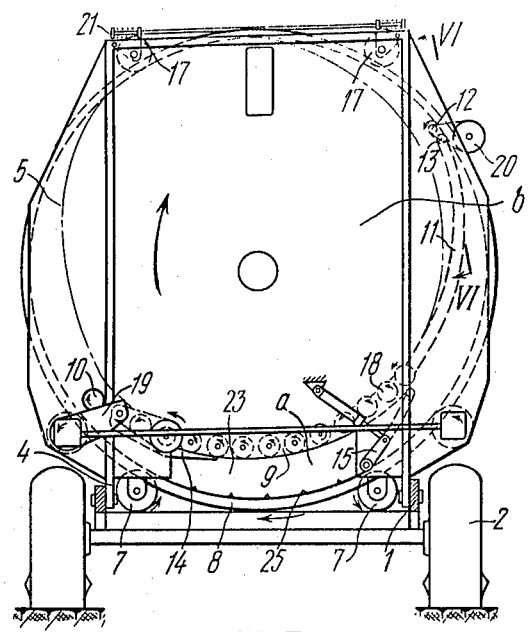
FIG. 3 is a front view of the baling chamber in the direction of arrow A in FIG. 1.
Figure 4:
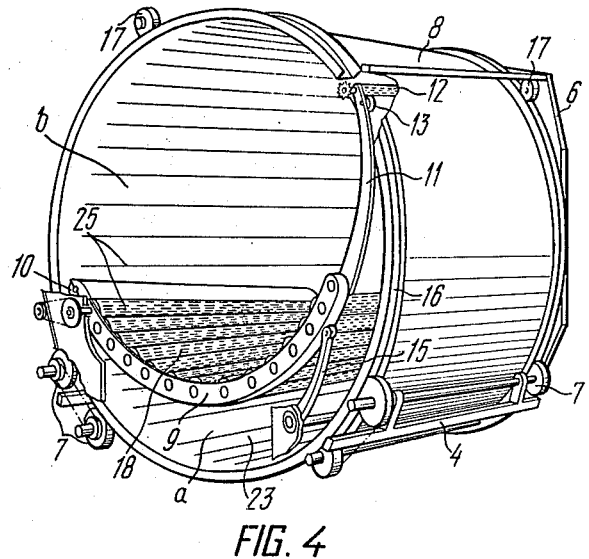
FIG. 4 is an axonometric view of the baling chamber with the front wall removed.
Figure 5:
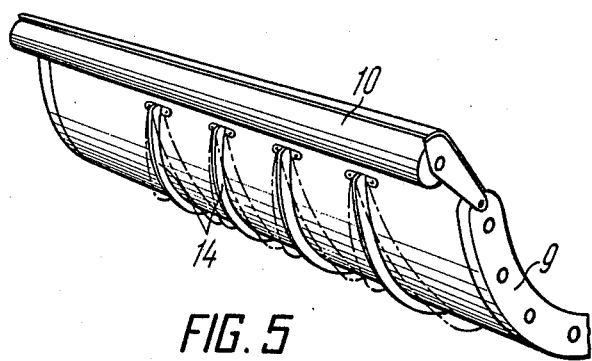
FIG. 5 is a perspective view of the roller table with the compressing roller and the elements distributing the material evenly throughout the volume of the tube.
Figure 6:
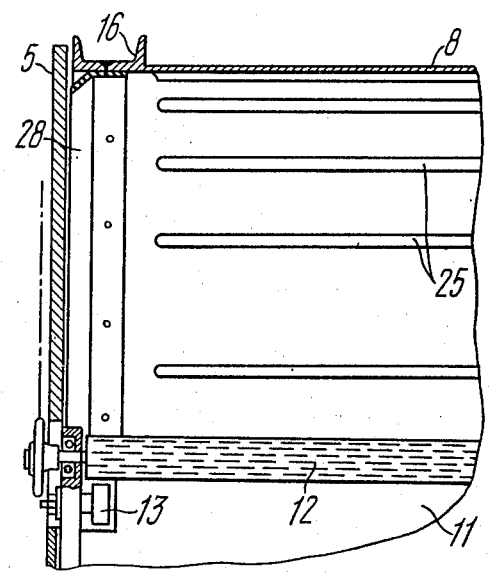
FIG. 6 is a cross sectional view taken along the line VI—VI in FIG. 3.

The rotobaler (FIGS. 1, 2, 3, 4, 5 and 6) according to the invention comprises a main frame 1 resting on the wheeled running gear 2 in the rear and on the tractor drawbar 3 in front. Hinged to the main frame 1 is an auxiliary frame 4 provided with front 5 and rear 6 end walls. Installed between these walls on the driving rollers 7 of the frame 4 is a tube 8 of the baling chamber. Accommodated inside the tube 8 and resting on the elements of the frame 4 is a roller table 9 to which are articulated a compressing roller 10 at one side and a radially curved shield 11 on the other. In the upper portion of the shield 11 are installed a deflecting roller 12 and supporting rollers 13. Elements 14 which distribute the material uniformly throughout the tube 8 are secured underneath the roller table 9, side by side with the compressing roller 10.

In addition, the elements of the frame 4 under the roller table 9 carry a frame-lifting mechanism 15. The baling chamber tube 8 has guide raceways 16 which interact with the driving rollers 7 and hold-down 17 rollers.

A number of rollers 18 with a drive 19 are mounted on bearings on the roller table 9. Instead of the rollers 18 other known conveying means may be used, for example, conveyors.

The deflecting roller 12 is provided with a drive 20 and the hold-down rollers 17 have a device 21 for adjusting the hold-down force of the rollers 17.

Longitudinal tilting of the baling chamber is carried out by power cylinders 22. The front end wall 5 of the frame 4 has a loading opening 23 through which the material is delivered from swaths into the baling chamber while the rear end wall 6 of the frame 4 can be lifted by the power cylinders 24 for discharging the finished baled roll.

The inside surface of the tube 8, the outer surfaces of the deflecting roller 12 and of the rollers 18 of the roller table 9 are provided with flutes 25 for better gripping of the material being baled.

Hinged to the frame 4 on the front portion of the baling chamber is a collecting means 26 for picking up hay and straw from swaths.

The torque is transmitted from the tractor PTO shaft 3 to the elements of the baling chamber and the collecting means 26 by a power transmission 27.

Close-up members in the form of rubberized belts 28 are installed between the tube 8 and the end walls 5 and 6 of the frame 4.

The rotobaler functions as follows.

The means 26 picks up the material from a swath and loads it through the loading opening 23 of the front end wall 5 of the frame 4 into the smaller space "a" under the roller table in the baling chamber.

Due to rotation of the tube 8 provided with flutes on the inner surface of the compressing roller 10 and the distributing elements 14, the material is pushed forward and is distributed uniformly over the tube in the space "b" above the roller table.

At first the compressed material falls in a disorderly manner on the roller table 9, but, as it accumulates gradually in the space "b" defined by the rollers 18 of the roller table 9, the end walls 5 and 6 of the frame 4, the radially curved shield 11 and the inner surface of the tube 8, the mass starts rotating and forming into a roll which then grows in size and fills the entire space "b".

To prevent the material from being entrained by the flutes 25 into the gap between the upper end of the radially-curved shield 11 and the tube 8, there is a deflecting roller 12 which rotates in the direction opposite to the rotation of the tube 8.

The material falling out partly through the gaps between the rollers 18 is prevented from falling on the ground by the close-up members in the form of rubberized belts 28 and, being acted upon by the flutes 25 of the tube 8, is returned again into the roll.

During the final stage of roll forming the requisite density of baling is achieved by the use of the mechanism 15 for lifting and lowering the roller table 9.

If necessary, any roll can be bound by the conventionally known means.

The finished roll is unloaded by lowering the roller table 9 by means of the mechanism 15, by opening the lower end wall 6 of the frame 4 by means of the power cylinders 24 and by tilting longitudinally the frame 4 jointly with the tube 8 by means of the power cylinders 22.

This structural layout of the rotobaler provides for making rolls of larger dimensions and mass, increasing the output, reducing losses and expenditures of labour per unit of output.

What is claimed is:

1. A rotobaler comprising: a frame with end walls; a means for picking up hay and straw material from swaths secured on said frame; a baling chamber having an opening in a front wall for loading the picked-up material and an opening in a rear wall for unloading a finished roll, and including a tube installed between the end walls of said frame in a direction parallel to the movement of the machine and rotatably secured on said frame for rotating about its own axis, an inside surface of said tube being provided with flutes; and a roller table movably installed inside of said tube relative to said baling chamber, outer surfaces of rollers of said roller table being provided with flutes.

2. A rotobaler comprising: a frame with end walls; a means for picking up hay and straw material from swaths secured on said frame; a baling chamber having an opening in a front wall for loading the picked-up material and an opening in a rear wall for unloading a finished roll, and including a tube installed between the end walls of said frame in a direction parallel to the movement of the machine and rotatably secured on said frame for rotating about its own axis; a roller table movably installed inside of said tube relative to said baling chamber; a compressing roller mounted inside said tube on a first side of said roller table, said compressing roller being articulated to said roller table; and a radially curved shield mounted inside said tube and on a second side of said roller table, said shield being articulated to said roller table and including a deflector roller and supporting rollers on an upper end.

3. A rotobaler as claimed in claim 2 wherein the tube and the compressing roller on one side and the deflecting roller and the roller table rollers on the other side are rotatable in mutually opposite directions.

4. A rotobaler as claimed in claim 2 wherein the inside surface of the tube and the outer surfaces of the deflecting roller and roller table rollers are provided with flutes.

5. A rotobaler as claimed in claim 2, wherein the tube accommodates elements which are secured on the roller table and distribute the material uniformly over the entire space of the tube.

6. A rotobaler as claimed in claim 2, wherein there are close-up members in the form of rubberized belts installed between the tube and the end walls of the frame.

* * * * *